United States Patent
Possley

(10) Patent No.: US 7,701,902 B1
(45) Date of Patent: Apr. 20, 2010

(54) SCHEDULING FOR SHARING CHANNEL ACCESS IN WIRELESS NETWORKS

(75) Inventor: Nicholas J. Possley, Gilroy, CA (US)

(73) Assignee: Xilinx, Inc., San Jose, CA (US)

(*) Notice: Subject to any disclaimer, the term of this patent is extended or adjusted under 35 U.S.C. 154(b) by 1062 days.

(21) Appl. No.: 11/388,498

(22) Filed: Mar. 24, 2006

(51) Int. Cl.
  *H04W 4/00* (2009.01)
  *G01R 31/08* (2006.01)
  *H04W 72/00* (2009.01)

(52) U.S. Cl. .................. 370/329; 370/233; 370/234; 455/450

(58) Field of Classification Search ............ 370/322, 370/431, 329
  See application file for complete search history.

(56) References Cited

U.S. PATENT DOCUMENTS 7,349,338 B2* 3/2008 Balachandran et al. ...... 370/232

2007/0133454 A1* 6/2007 Ware et al. ............... 370/328

* cited by examiner

*Primary Examiner*—Nick Corsaro
*Assistant Examiner*—Huy C Ho
(74) *Attorney, Agent, or Firm*—W. Eric Webostad; Thomas George

(57) ABSTRACT

A method for scheduling channel usage for an over-the-air ("wireless") network downlink is described. Information associated with incoming traffic and outgoing traffic to a node as associated with user equipment is obtained. The user equipment is capable of establishing a communication link with the node. The information obtained is placed in respective queues, which are each associated with the user equipment. A count level of the queues is obtained. An interval rate for the incoming traffic is determined. A receive rate for the user equipment is obtained. An incoming average rate for the incoming traffic is determined. An outgoing average rate for the outgoing traffic is determined. A proportion value is generated responsive to the incoming average rate, the outgoing average rate, the receive rate, and the interval rate.

12 Claims, 6 Drawing Sheets

SCHEDULING FOR SHARING CHANNEL ACCESS IN WIRELESS NETWORKS

FIELD OF THE INVENTION

One or more aspects of the invention relate generally to communications and, more particularly, to scheduling for sharing channel access for over-the-air ("wireless") network downlinking.

BACKGROUND OF THE INVENTION

In communication systems, information traffic ("traffic") is conventionally transported across shared media. Such traffic may be packet-based, cell-based, frame-based, or other type of information package. A scheduler controls access to such shared media. Thus, for example, packets may be queued in any of a variety of known queuing configurations, and the scheduler determines which queues may send packets and when they may be sent.

More recently, in over-the-air ("wireless") networking, sharing of channels has become more problematic with an increase in wireless data traffic. This is becoming more problematic as more people use mobile products, such as portable smart phones, personal data assistants ("PDAs"), notebook computers, and the like to download information via the Internet. Concurrently, standards are emerging for this type of wireless communication. For example, with respect to packet downlink traffic, High-Speed Downlink Packet Access ("HSDPA") is a packet-based data service for a Wideband Code Division Multiple Access ("W-CDMA") downlink. HSDPA uses "fast scheduling" where the scheduler is moved from the Radio Network Controller ("RNC") down to the Node-Bs, namely the base transceiver stations where W-CDMA is the air transport technology. Other examples of mobile protocols which include downlinking are CDMA2000, including Evolution-Data Optimized ("EV-DO"), and Worldwide Interoperability for Microwave Access ("WiMAX"). Notably, as used herein, "include" and "including" mean including without limitation.

Regardless of the protocol used, or at which node or station, including substation, the scheduler is located, it would be desirable and useful to provide increased channel reuse to accommodate situations where the number of channels is exceeded by the number of users attempting to access such channels. Notably, the term "user," including plural forms thereof, is used interchangeably with the phrase "User Equipment ("UE")," including plural forms thereof. Moreover, the term "node" as used herein is meant to include station, substation, and like types of points of presence in a network. The term "network" includes an air transport network, including a mesh network and a cellular network.

To increase channel reuse, a scheduler may take into account various factors depending on the protocol criteria implemented to determine the next queue to have packets sent from it. Examples of one or more factors that may be considered include packet length, queue fullness, the last queue to send, time since last packet sent from a queue, and available bandwidth on the downlink side, or any combination thereof. Additionally, the concept of "fairness" has been used in scheduling. Fairness basically means that each queue should be allotted its fair share of available bandwidth. A fair share may be an equal share subject to relative characteristics of the link, including UE capabilities.

Along those lines, others have proposed a "Proportional Fairness Scheduler" ("PFS") to schedule access to channels. Generally a PFS will allocate more bandwidth to one or more users having the ability to receive higher data rates when such users' average usage rate has been lower. Weighting for allocation of bandwidth by a PFS is determined by the ratio of an instantaneous data rate to an average usage rate of each UE downlink. Instantaneous data rate in this context corresponds to quality of the link, namely the potential downlink data rate, and does not take into account actual data traffic usage of the link. Thus, a problem with a PFS is that high performance users, namely users capable of higher download speeds, generally are allocated excessive amounts of bandwidth during periods of relative inactivity of such high performance users or when such high performance users do not consume all of the bandwidth allocated to them, or a combination thereof. Allocation of too much bandwidth may have a significant impact on effectiveness of utilized bandwidth per user, which impact may become more apparent as link congestion increases.

Accordingly, it would be desirable and useful to provide a scheduler that provides enhanced channel reuse over that of a PFS.

SUMMARY OF THE INVENTION

One or more aspects of the invention generally relate to communications and, more particularly, to scheduling for sharing channel access for over-the-air ("wireless") network downlinking.

An aspect of the invention is a method for scheduling channel access. In a method for scheduling channel access, information associated with incoming traffic and outgoing traffic to a node as associated with user equipment is obtained. The user equipment is capable of establishing a communication link with the node. The information obtained is placed in respective queues, which are each associated with the user equipment. A count level of the queues is obtained. An interval rate for the incoming traffic is determined. A receive rate for the user equipment is obtained. An incoming average rate for the incoming traffic is determined. An outgoing average rate for the outgoing traffic is determined. A proportion value is generated responsive to the incoming average rate, the outgoing average rate, the receive rate, and the interval rate.

Another aspect of the invention is another method for scheduling channel access, information associated with incoming traffic and outgoing traffic to a node as associated with equipment of users is obtained. The equipment of users is capable of establishing respective communication links with the node. The information obtained is placed in respective sets of queues which are respectively associated with the equipment of users for a correspondence between the sets of queues and the communication links. Count levels of queues in the sets of queues are obtained. Interval rates for the incoming traffic as stored in a first portion of the sets of queues are determined. Receive rates for the equipment of users are obtained. Incoming average rates for the incoming traffic are determined responsive to the interval rates. Outgoing average rates for the outgoing traffic as stored in a second portion of the sets of queues are determined. Proportion values are respectively generated responsive to the incoming average rates, the outgoing average rates, the receive rates, and the interval rates.

Yet another aspect of the invention is a method for bandwidth allocation. First packet information associated with an incoming side of a node is obtained. Second packet information associated with an output side of the node is obtained. The first packet information is accumulated in first queues and the second packet information is accumulated in second queues. First data rates associated with the first packet information are determined, each of the first data rates determined over a first time interval per queue of the first queues. Second data rates associated with the second packet information are determined, each of the second data rates determined over a second time interval per queue of the second queues. A first average rate for the first data rates is generated for each of the first queues. A second average rate for the second data rates is generated for each of the second queues. The first average rate and the second average rate are combined to provide a denominator value. A receive rate for a mobile device linkable to the node via air transport is obtained. The first data rate and the receive rate are combined to provide a numerator value. The numerator value is divided by the denominator value to provide a proportion for the bandwidth allocation.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
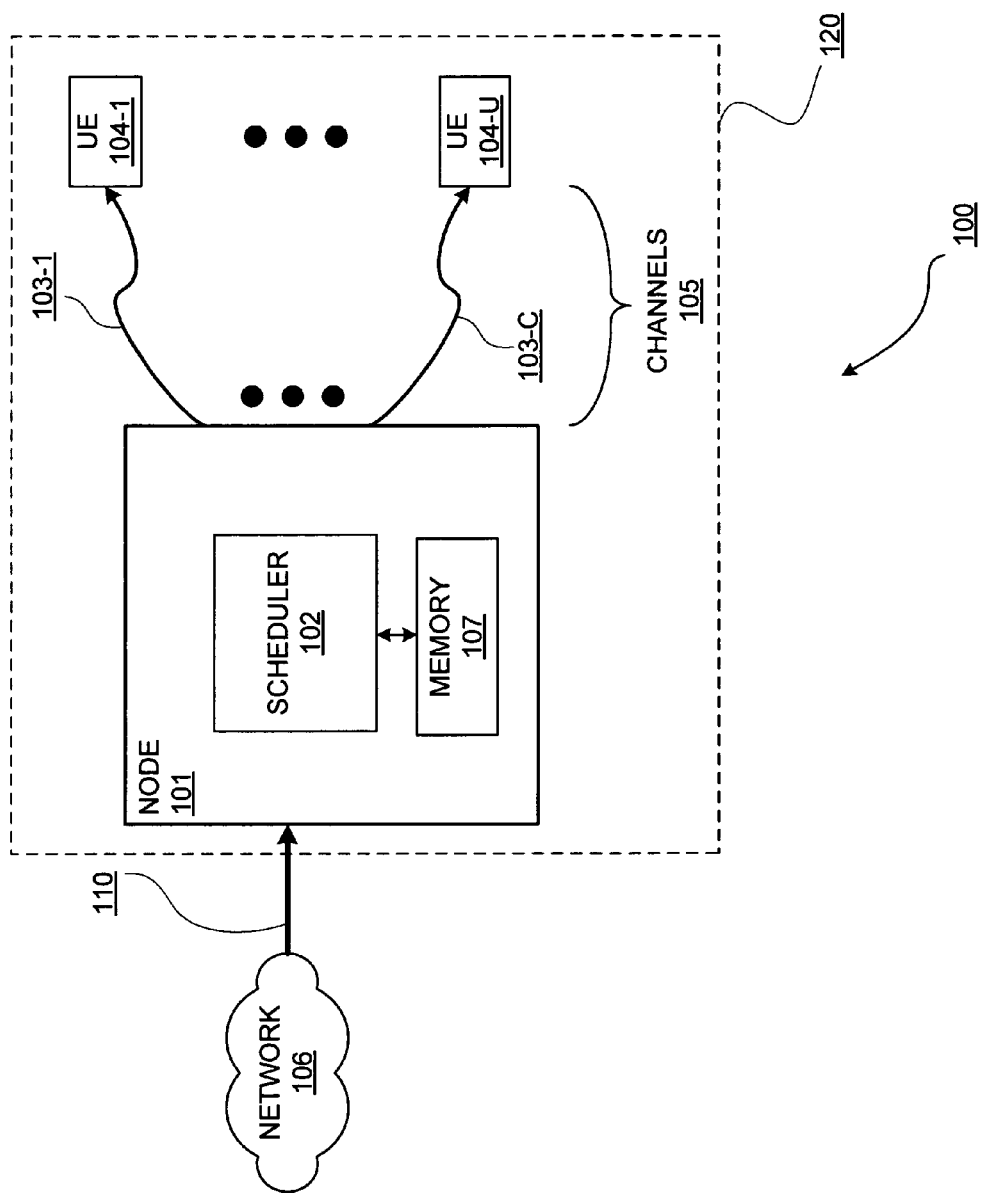
FIG. 1 is a network diagram depicting an exemplary embodiment of a communications system.

FIG. 1 is a network diagram depicting an exemplary embodiment of communications system 100. System 100 includes node 101 coupled to network 106. Node 101 may be put in communication with one or more instances of user equipment ("UE") 104-1 through 104-U, for U a positive integer greater than one. For purposes of clarity and not limitation, UE is referred to hereinafter as a "target destination," including the plural form thereof, which may include an end or interim destination.

Network 106 may be coupled to node 101 via a backhaul 110 or other known broadband communication link. Notably, a backhaul 110 need not be used, as a broadband communication link with a bandwidth less than that of backhaul 110 may be used. However, in this exemplary implementation, generally backhaul 110 is a fiber optic link. Furthermore, it should be appreciated that backhaul 110 need not be a hardwired terrestrial line, but may be over the air or through space, or any combination thereof. Node 101 may be a network node, a base station, a substation, or other point in an over-the-air ("wireless") network used for establishing communication links with target destinations 104-1 through 104-U. Node 101 linked to one or more target destinations 104-1 through 104-U may form a local network 120 coupled to network 106 via backhaul 110.

Notably, the number of channels available to node 101 for establishing communication links may be less than the number of target destinations 104-1 through 104-U that are identified by node 101 as potentially being currently active. By "potentially being currently active," it should be understood that one or more target destinations 104-1 through 104-U may be mobile units, and thus may go into or out of range of node 101. Furthermore, such target destinations 104-1 through 104-U may not be actively downloading information from network 106 via node 101. It should be appreciated that network 106 may be a public network, such as the Internet, a private network, a virtually private network, or other known type of network. Although backhaul 110 and wireless links 103-1 through 103-C, for C a positive integer greater than one, are only shown in a download direction for purposes of this disclosure, it should be appreciated that the uplink direction may be present in communication system 100.

Thus, it should be understood that communication traffic from network 106 may be provided to node 101 via backhaul 110. This incoming traffic may be packet, cell, frame, or other known configuration of data communication. Protocols mentioned elsewhere herein as well as other known protocols may be used for establishing one or more wireless links 103-1 through 103-C.

It should be appreciated that the number of wireless links 103-1 through 103-C is at each instant of time limited to the number of channels 105 available to node 101. Thus, when there are more target destinations than available channels, a function of node 101 is to schedule shared access to target destinations. In short, this means that node 101 allocates bandwidth to target destinations 104-1 through 104-U on a scheduled basis.

This scheduling may be implemented as a scheduler 102 of node 101. Such scheduler 102 of node 101 may be implemented in software, firmware, hardware, programmable logic, or any combination thereof for managing bandwidth allocation for target destinations 104-1 through 104-U via assignment of channels 105 for purposes of establishing wireless links 103-1 through 103-C. Memory 107 may be coupled to scheduler 102 for storing information for allocation of bandwidth by scheduler 102, as described below in additional detail.

Communications system 100 as between node 101 and target destinations 104-1 through 104-U may be any type of wireless network. Again, any of a variety of known air transport protocols may be used, including High-Speed Downlink Packet Access, Wideband Code Division Multiple Access, Worldwide Interoperability for Microwave Access, or Code Division Multiple Access 2000. Examples of target destinations 104-1 through 104-U include portable smart phones, PDAs, and notebook computers, among other known types of mobile devices capable of establishing a wireless link for data transport.

Figure 2:
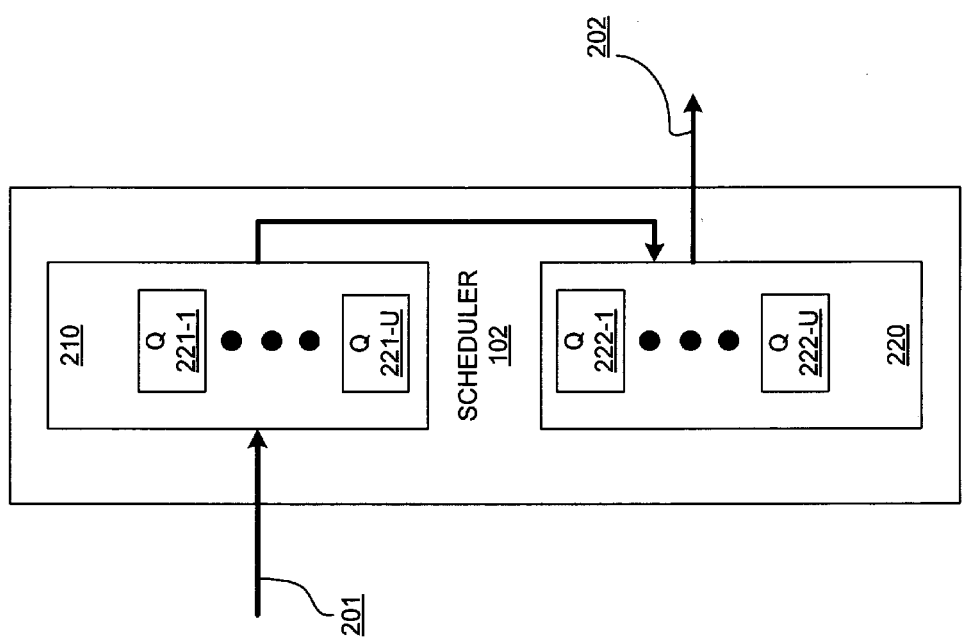
FIG. 2 is a block diagram depicting an exemplary embodiment of a scheduler of the communications system of FIG. 1.

FIG. 2 is a block diagram depicting an exemplary embodiment of scheduler 102 of FIG. 1. Incoming traffic 201 may be received to an incoming queue 210 of scheduler 102. Incoming traffic 201 may be obtained from backhaul 110 of FIG. 1, and may be any of a packet, cell, frame, or other known data transport format. Incoming queue 210 may include multiple queues 221-1 through 221-U. Incoming queues 221-1 through 221-U respectively correspond to target destinations 104-1 through 104-U.

It should be appreciated, therefore, that incoming traffic 201 is parsed and respectively placed in queues 221-1 through 221-U as associated with target destinations 104-1 through 104-U for a download of information. This downlinking may include passing incoming information from queues 221-1 through 221-U of incoming queue 210 to queues 222-1 through 222-U of outgoing queue 220 of scheduler 102. In an alternative implementation, queues 221-1 through 221-U may be divided for handling both incoming and outgoing traffic.

In this implementation, queues 222-1 through 222-U respectively correspond to target destinations 104-1 through 104-U. Outgoing traffic 202, which may be any of a packet, cell, frame, or other known data transport format, is provided onto one or more of channels 105 for communication to one or more target destinations 104-1 through 104-U via one or more wireless links 103-1 through 103-C.

Figure 3:
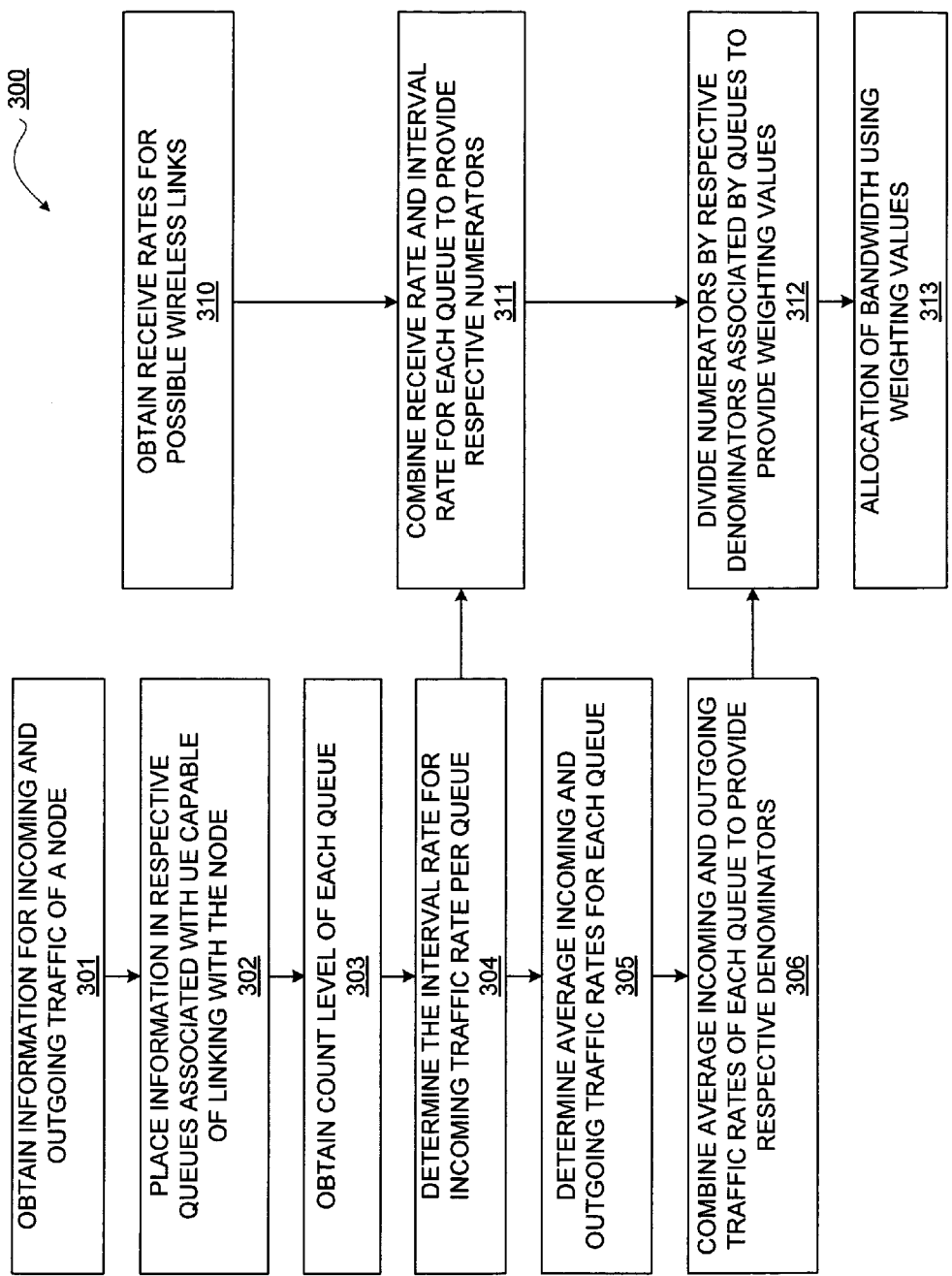
FIG. 3 is a flow diagram depicting an exemplary embodiment of a scheduling flow, which may be used for implementation of the scheduler of FIG. 2.

FIG. 3 is a flow diagram depicting an exemplary embodiment of a scheduling flow 300, which may be used for implementation of scheduler 102 of FIG. 2. Scheduling flow 300, at 301, obtains information for incoming and outgoing traffic of a node. At 302, information obtained at 301 is placed in respective queues associated with one or more target destinations capable of linking with the node. At 303, count levels of each queue may be obtained in order to know the level of fullness of such queues. At 304, the interval rate for incoming traffic per queue may be determined.

In parallel with any of the operations of 301 through 304, at 310, receive rates for wireless links associated with target destinations may be obtained. Notably, these receive rates may include possible receive rates, as some target destinations may not establish wireless links for downloading information, such as from the Internet for example. Receive rates may be associated with UE capabilities of target destinations. For example, the maximum rate at which target destinations may receive downloaded data may be a limiting factor in bandwidth allocation. Moreover, bandwidth of a channel may be a limiting factor in communication with a target destination. Thus, a receive rate may be a maximum download speed or other download speed less than the maximum at which a target destination is capable of receiving downloaded data via a downlink.

At 305, an average incoming traffic rate and an average outgoing traffic rate may be determined for each of the queues. Notably, the interval rate determined at 304 for incoming traffic may be used for determining the average incoming traffic rate at 305.

At 306, average incoming and outgoing traffic rates are combined for each queue to provide respective denominator values. At 311, which may be done in parallel with operations at 305 and 306, a receive rate and an associated interval rate for each queue may be combined for each queue to provide respective numerator values. It should be appreciated that because incoming traffic is respectively associated with target destinations via assigned queues for those users, a receive rate of a target destination may be associated with a queue assigned to such target destination for incoming traffic. Accordingly, the interval rate for such incoming traffic for a target destination may be associated with the receive rate of the queue assigned to the target destination.

Moreover, it should be appreciated that with respect to combining average incoming and outgoing traffic rates of each queue at 306, such combination is implicitly associated with respective target destinations to which such queues have been assigned. The determination of incoming and outgoing traffic rates per queue at 305 is therefore also associated with respective target destinations.

At 312, the numerators determined at 311 are respectively divided by the denominators determined at 306, as associated by queues. Each ratio determined at 312 accordingly provides a weighting value that may be ascribed to target destination. At 313, the weighting values determined at 312 are used for allocation of bandwidth. In other words, bandwidth portions may be allocated to one or more target destinations.

Figure 4:
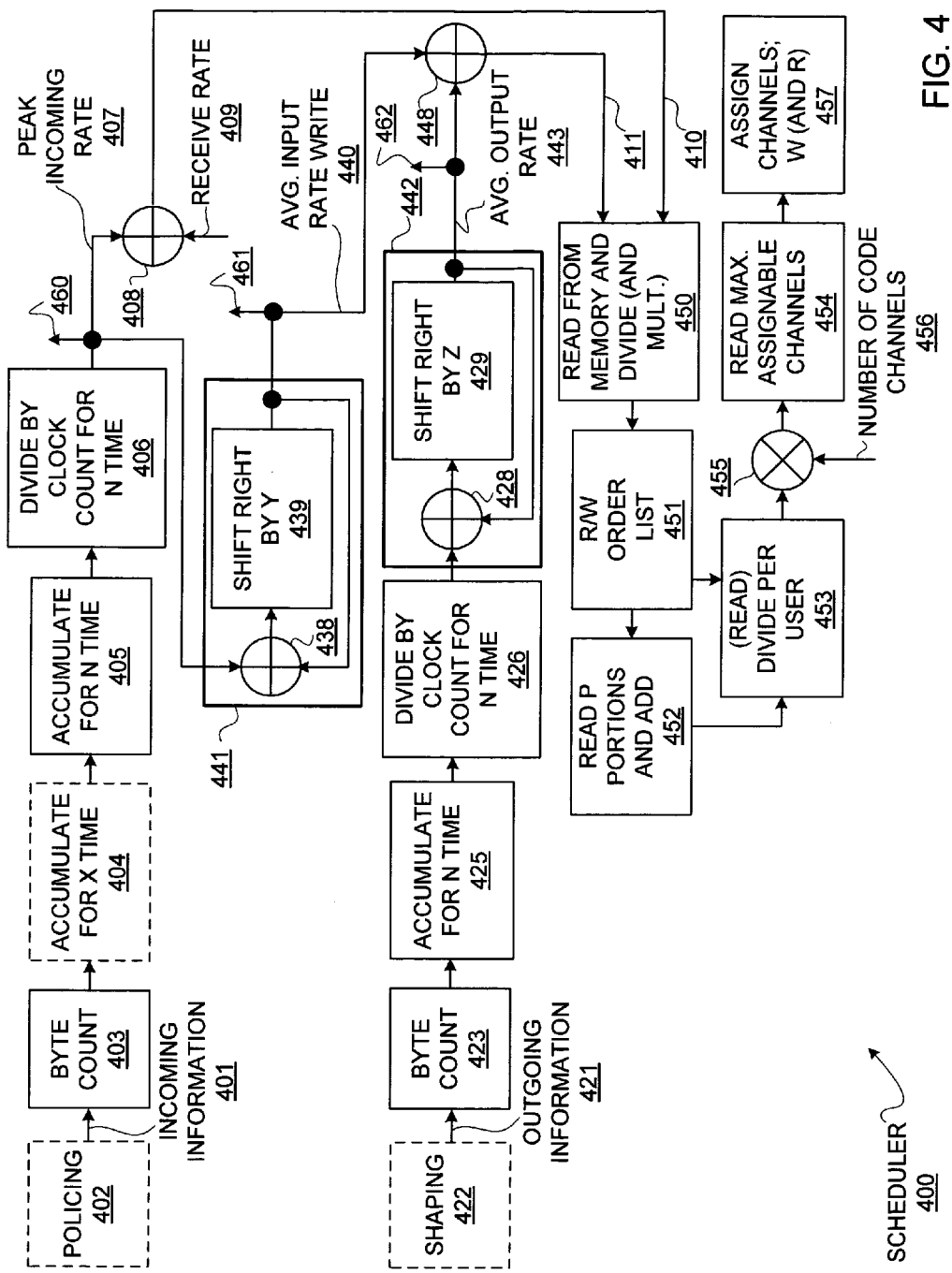
FIG. 4 is a block flow diagram depicting an exemplary embodiment of a scheduler with additional detail with respect to the block diagram of FIG. 2.

FIG. 4 is a block flow diagram depicting an exemplary embodiment of a scheduler 400. For purposes of clarity by way of example and not limitation, it shall be assumed that scheduler 400 is to be used in a High-Speed Downlink Packet Access ("HSDPA") environment, and thus the number of assignable channels is a maximum of 15. However, it should be appreciated that other maximum numbers of assignable channels may be used. Moreover, it shall be assumed, owing to the use of the HSDPA protocol, that channels are reassigned every two milliseconds ("ms"), and thus that scheduler 400 updates every 2 ms. Notably, the update interval for reassignment of channels need not be 2 ms, and thus other update timing intervals may be used.

Scheduler 400 may be used with any protocol in which channels are periodically reassigned to target destinations. As will be appreciated from the following description, channels are reassigned in order to enhance throughput. This enhancement of throughput may be achieved, at least in part, by considering differences between arrival rates of information to a node and associated outgoing rates to target destinations at various times or periods of time.

At the outset, it should be understood that even though a single instance of scheduler 400 is illustratively shown, multiple iterations or functions of scheduler 400 may be implemented in a single instantiation, where each operational cycle of scheduler 400 is assigned to a user. In other words, operation of scheduler 400 may be time-sliced across all target destinations in order to reduce the amount of overhead used to provide scheduler 400. Alternatively, multiple instances of scheduler 400 may be used to support multiple groupings of target destinations.

Incoming packet information 401 and outgoing packet information 421 are received by scheduler 400. Again, because an HSDPA example implementation is described, the form of traffic is packets; however, it should be appreciated that other forms of traffic may be used. Incoming packet information 401 may include the fact that there is a packet, identify which user the packet belongs to, and indicate the size of the packet. The size of the packet may be indicated in bytes; however, size increments other than bytes may be used. Accordingly, this incoming packet information 401 may be thought of as a packet descriptor.

Prior to receiving incoming packet information 401, scheduler 400 with use of a policing block 402 may regulate the speed at which such incoming packet information 401 is received. As policing block 402 is well known, it is not described in any detail herein, and is an optional feature of scheduler 400.

Outgoing packet information 421, which may include a packet descriptor identifying that there is a packet, identify which user is to receive the packet, and indicate the size of the packet in bytes, may be received by scheduler 400 in parallel with incoming information 401. Moreover, outgoing packet information 421 may be first received to a shaping block 422 to regulate the speed at which outgoing packet information 421 is received by scheduler 400. As shaping block 422 is well known, it is not described in any details herein, and is an optional feature of scheduler 400.

Incoming packet information 401 is provided to byte count per queue block ("counter") 403, and outgoing packet information 421 is received to byte count per queue block ("counter") 423. Again, although bytes are being counted in this exemplary implementation, other increments of packet size may be used. Counters 403 and 423 count the number of bytes in an incoming queue and an outgoing queue, respectively, as associated with a target destination, as previously described. Thus, it should be appreciated that packets are queued as they are received to a node, and queued for scheduling the output of those packets from the node.

The byte counts per queue output from counters 403 and 423 are respectively provided to accumulators 405 and 425. Accumulator 405 accumulates the byte count for an interval time of N for the incoming queue currently being processed by scheduler 400. Time N may be the update rate of scheduler 400, such as 2 ms, or another time. Accumulator 425 accumulates byte count output from counter 423 over an interval of time N for the outgoing queue currently being processed by scheduler 400. For scheduler 400 provided as a core, such as for instantiation in a programmable logic device ("PLD"), time N may be a user-selectable parameter.

It should be appreciated that incoming packet information 401 may arrive faster than outgoing packet information 421 is provided. In order to accommodate some adjustability for a disparity between the rate at which incoming packet information 401 is received and the rate at which outgoing packet information 421 is provided, an accumulator 404 may optionally be interposed between counter 403 and accumulator 405. Accumulator 404 may accumulate byte count as output from counter 403 over an interval time X for an incoming queue currently being processed by scheduler 400. Time X, namely the short or pre-update interval, may be substantially less than time N, namely the long or update interval. For example, time X may be in microseconds, whereas time N may be in milliseconds. For a core, such as to be instantiated in a PLD, time X may be a user-specified parameter. Output of accumulator 404, namely the accumulated output of counter 403 over a number of intervals of time X, may be provided to accumulator 405.

Output of accumulator 405 is provided to divide-by clock count block ("divider") 406, and the output of accumulator 425 is provided to divide by clock count block ("divider") 426. Divider 406 divides an output of accumulator 405 by a clock count for an interval of time N. For example, the divide-by clock count may be the number of clock pulses received over a 2 ms interval. Thus, output of dividers 406 and 426 is an interval for peak incoming and outgoing information rate, respectively. The output of divider 406 may be a value, such as of a peak incoming rate for the incoming queue currently being processed by scheduler 400, which may be written to memory, such as memory 107 of FIG. 1. Notably, such peak incoming rate 407 output by divider 406 may be written to memory in association with an incoming queue as generally indicated at 460, and may be provided as an input to addition block ("adder") 408. Moreover, output of divider 406 may be provided as an input to addition block ("adder") 438.

Another input to adder 408 may be a receive link delivery rate ("receive rate") 409 as associated with a target destination currently being processed. Notably, this receive rate is for one channel; however, more than one channel may be assigned to a target destination. The receive rate may be determined by the channel quality, and may depend on other factors, including the modulation scheme indicating how many bits per symbol may be used. Notably, the receive rate may be the actual rate at which a target destination may receive data. Receive rate 409 and peak incoming rate 407 are combined by adder 408 to provide a numerator value as generally indicated at 410.

As mentioned above, output of divider 406 is provided to adder 438. Output of adder 438 is provided to a shift-by block ("shifter") 439. Shifter 439 may shift output of adder 438 to the right by one bit, for Y equal to one. Continuing the example of Y equal to one, a shift to the right by one bit is a divide by two operation. Operations other than a divide by two operation may be done, such as using a larger divisor for example. Output of shifter 439 is provided as an input to adder 448 and as a feedback input to adder 438. Accordingly, the combination of adder 438 and shifter 439 with feedback is an average block ("averager") 441. Output of averager 441 is an average input rate 440 for the incoming queue currently being processed by scheduler 400 and is provided to adder 448. This running average input rate 440 may be written to memory, such as memory 107 of FIG. 1, as generally indicated at 461. Notably, other known implementations for providing a running average may be used other than a shifter and an adder.

Divider 426, like divider 406, divides by a clock count for a period of time N, though for the outgoing queue currently being processed by scheduler 400. A peak outgoing rate output by divider 426 is provided as an input to adder 428. Output of adder 428 is provided as an input to shift-by block ("shifter") 429. Shifter 429 may shift output of adder 428 to the right by an integer number of bits Z. For Z equal to 1, shifter 429 is a divide by two operation; however, other divisor values may be used. Output of shifter 429 is provided as an input to adder 448 and as a feedback input to adder 428. Accordingly, shifter 429 and adder 428 in combination with feedback provide an averager 442 comparable to averager 441. Notably, parameters Y and Z respectively of shifters 439 and 429 may be user-specified parameters, such as for instantiation of a core in an PLD.

Output of averager 442 is a running average output rate 443 for an outgoing queue currently being processed by scheduler 400, which may be written to memory, such as memory 107 of FIG. 1, as generally indicated at 462. Adder 448 adds an average input rate obtained from averager 441 with an average output rate obtained from averager 442 to provide a respective denominator value, as generally indicated at 411. A numerator value 410 and a denominator value 411 for an incoming queue and an outgoing queue, respectively, currently being processed by scheduler 400 are input to divider 450. Notably, in a PLD implementation, adders 408 and 448 may be combined with circuitry of divide-by block ("divider") 450. Notably, a software or other circuit implementation, such as other than the circuitry described in this example, may be used.

Notably, receive rates for receive rate 409 may be stored in memory such as memory 107 of FIG. 1 for multiple channels. These receive rates may be stored in respective association with target destinations. Thus, a receive rate 409 input to adder 408 may be retrieved from memory, such as memory 107 of FIG. 1, by divider 450. As mentioned above, adders 408 and 448 may be part of divider 450, so values input to adders 448 and 408 may be read from memory. Regardless of particular implementation, divider 450 obtains numerator and denominator values 410 and 411, respectively. Divider 450 may then divide a numerator value 410 by a denominator value 411. Notably, this divide-by operation is associated with a target destination associated with respective incoming and outgoing queues currently being process and used to produce a proportion.

After determining a ratio or proportion at divider 450, such proportion may be output for purposes of listing it as an initial proportion or a replacement proportion to be added to a listing of proportions. Notably, a proportion output from divider 450 in association with a target destination may be used to update, namely replace, a previously determined proportion output in association with such target destination. This replacement proportion may be used for determining bandwidth portions for scheduling channel allotment for an update cycle. Thus, for example, a search, such as a binary tree search, may be used to determine where the then-current output from divider 450 is to be ranked or placed in a list of other proportions, as generally indicated at order list block ("ordering block") 451. Notably, at 451 the current listing of proportions may be read from memory, and then written back to memory with the updated proportion being added to the list.

Proportions ordered by ordering block 451 may be a listing of the proportions associated with each target destination, which may be stored in memory such as memory 107 of FIG. 1. Notably, a read from memory by ordering block 451 may be used to obtain a then current listing and a write to memory by ordering block 451 may be used to add an output from divider 450 to such listing. The proportion output from divider 450 is put into a ranking as proportions are ordered by ordering block 451. The top P proportions, which may be thought of as P bandwidth portions, are retrieved from the listing and added by read and add block 452. Because there is a finite number of channels assignable, namely P channels where P is an integer greater than one, only the top P bandwidth portions need to be obtained from the ranking of ordering block 451 for purposes of channel assignment. Continuing the above example of an HSDPA environment, P is equal to 15; however, fewer or more channels may be available depending on the implementation.

Read and add block 452 outputs a total for P portions to divide-by block ("divider") 453. The output of read and add block 452 is used as a denominator by divider 453. Ordering block 451 indicates to read and add block 452 that the top P portions may be retrieved from memory as reordered by ordering block 451. Ordering block 451 may further provide an output, namely the top P portions of the ordered list, to divider 453. Optionally, the updated ordered listing of portions may be stored in memory, as previously described, and consequently output from ordering block 451 provided to divider 453 may be a flag for divider 453 to read the top P portions from memory. Accordingly, divider 453 divides each of the P portions by the total obtained from read and add block 452. Thus, it should be appreciated that each divided portion represents an indication of a target amount of channel bandwidth to be allocated to P target destinations.

Thus, the numbers generated by divider 453 represent respective percentages of target bandwidth usage. Each percentage may be used to allocate bandwidth to a user actually having something to send and having a relatively high quality of wireless link performance.

It should be appreciated that by considering the difference between arrival rate of information to a node and outgoing rate of information from the node in different time periods, bandwidth utilization, or more particularly bandwidth reuse, may be enhanced. For example, the ratio of the quantity of arrival rate at time T0 plus the receive rate at time T1 divided by the quantity of the arrival rate at time T2 plus the outgoing rate at time T3 facilitates providing bandwidth proportions that enhance bandwidth utilization. Notably, this assumes that time T0 is less than time T2 and that time T1 is less than time T3. Using this type of ratio, users with sudden bursts, and with relatively better receive rates may obtain a relatively higher proportion of bandwidth allocation. This facilitates an enhancement of bandwidth utilization of one or more wireless links with a reduction in the amount of dropped traffic, including dropped traffic due to dynamic linking conditions.

Continuing the description of the example of bandwidth allocation, the ratios indicating percentage of user bandwidth targeted for the top P users is output from divider 453 and provided to multiplier block ("multiplier") 455 for multiplication with the number of code channels 456 available. Code channels 456 may be channels 105 of FIG. 1. Notably, it may be that not all P code channels are available. As the number of code channels available may be known by a node, it is not described in unnecessary detail herein. The output of multiplier 455 indicates how many channels each user would consume if the user's bandwidth portion needs were met. Notably, the output of multiplier 455 may indicate that a user has a bandwidth proportion in excess of one channel.

Maximum assignable channels block ("limit block") 454 reads the maximum number of channels assignable to a user from memory. For example, each target destination may be associated with a maximum number of assignable channels from which it may receive data. If the portion of bandwidth output from multiplier 455 indicates a number of channels in excess of the maximum number of channels assignable to a user, in that situation such a user may at most only be assigned the maximum number. Furthermore, it should be appreciated that output from multiplier 455 may be truncated or rounded up.

Output from limit block 454 is provided to channel assignment block 457. Channel assignment block 457 assigns channels to users in accordance with their ranking or portion of bandwidth, subject to a maximum assignable channel number obtained by limit block 454, and writes the assignment of channels to memory. As mentioned above, in this implementation there is a finite number, namely P, of assignable channels; owing to limitations as determined at limit block 454, some of P channels may not be assigned to the highest ranked user. In such a circumstance, available channels may be assigned by channel assignment block 457 to the next one or more users in the ranking, depending on the number of unassigned channels, as read from memory. Notably, a linked list pointer for each user may be used for ranking and storing such ranking in memory, which may facilitate subsequent retrieval of such ranking or portion thereof. Thus, optionally channel assignment block 457 may read from memory the prior channel assignment and updated the channel assignment read by writing the current channel assignment to it, which may in effect replace the channel assignment read.

Accordingly, it should be appreciated that because more than one channel may be assigned to a target destination, it is possible that a channel will not be assigned to each of the top P portions as only the target destination with the highest ranking proportion is guaranteed assignment of one or more channels on each update cycle.

Notably, quality of service ("QoS") may be enhanced by users where they increase the number of maximum assignable channels to them. Additional QoS enhancements, other than policing block 402 and shaping block 422, may include having an additional weighting done for a user. For example, divider 450 may read from memory to obtain an additional weighting factor, if any, associated with a particular target destination. If any such additional weighting factor is present, such additional weighting factor may be used to generate a ranking of the user associated with that target destination.

Figure 5:
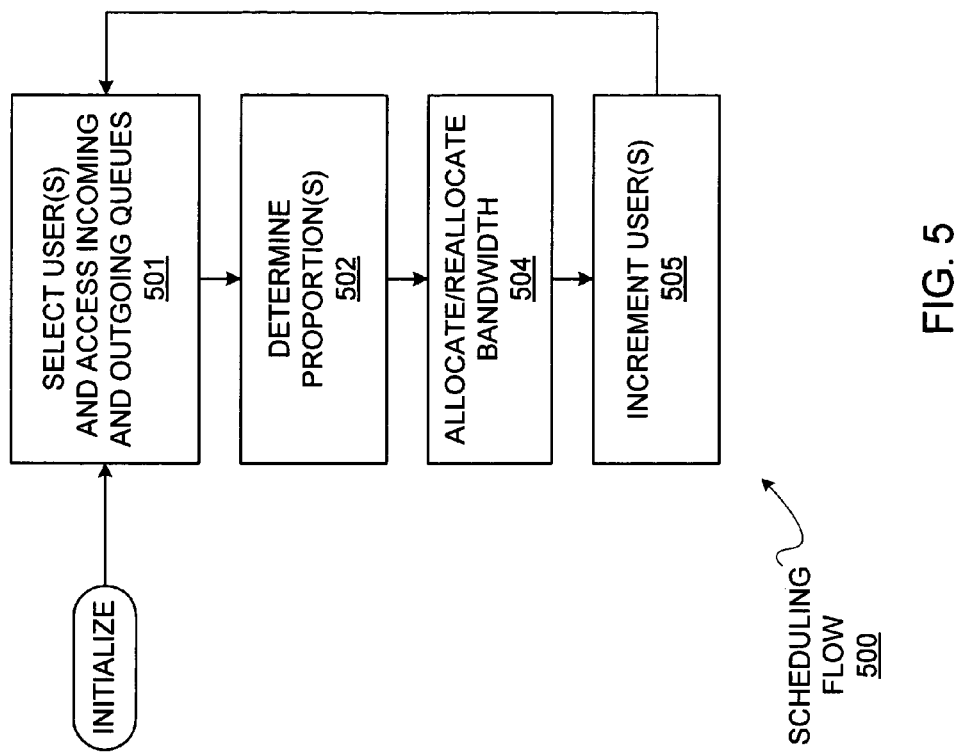
FIG. 5 is a flow diagram depicting an exemplary embodiment of a scheduling flow with additional detail with respect to the flow diagram of FIG. 3.

FIG. 5 is a flow diagram depicting an exemplary embodiment of a scheduling flow 500. After initializing scheduling flow 500, at 501 a user, namely a target destination, is selected, and access to incoming and outgoing queues associated with that selected user is obtained for purposes of scheduling. At 502, a proportion for the user, such as may be obtained by divider 450 of FIG. 4, is determined for purposes of bandwidth allocation. At 504, bandwidth is allocated, or if not an initial allocation, reallocated, responsive to the proportion determined at 502, if such proportion entered into a ranking of the top P proportions. If such proportion did not enter into the top P proportions, no change in the allocation of bandwidth results at 504. At 505, the user number is incremented, and scheduling flow 500 returns to 501 to repeat the flow for the next selected user. Accordingly, it should be appreciated that a single instance of a scheduler may be used where scheduling flow is cycled at least once in an interval of time N, which in the above example with reference to FIG. 4 is equal to 2 ms. Thus, each target destination may be processed in a round robin sequence. Alternatively, as generally indicated in FIG. 5, incoming rates, receive rates, outgoing rates, and interval rates may be generated for more than one target destination at a time, and respective proportions for each such target destination may be determined.

Accordingly, it should be appreciated that the above description applies to any network node in any wireless network where there is contention for channels or where channels are assigned on a per-timeslot basis, or any combination thereof. By determining a rate differential by examining data regarding the incoming and outgoing activity on a wireless link, namely what is actually transpiring on the wireless link and what is pending for the wireless link, it is possible to make decisions for purposes of increased bandwidth utilization. Again, although an example of a scheduler has been generally described in terms of hardware, it should be appreciated that such scheduler may be implemented in software. Furthermore, code may be written into a Digital Signal Processor to provide a scheduler. Moreover, a scheduler may be provided as a core for instantiation in a PLD, such as a Field Gate Programmable Array ("FPGA").

Figure 6:
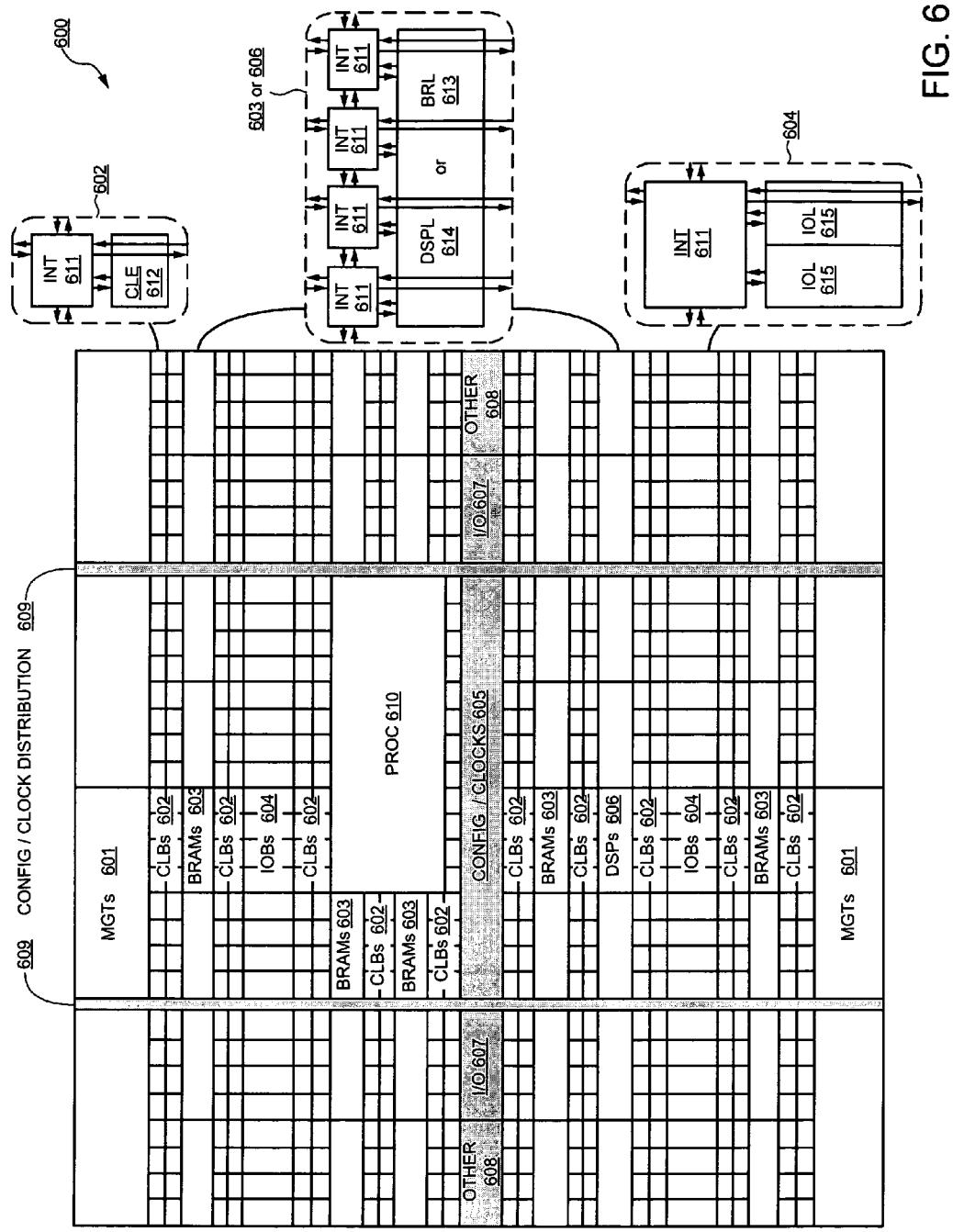
FIG. 6 is a simplified block diagram depicting an exemplary embodiment of a columnar Field Programmable Gate Array ("FPGA") architecture in which one or more aspects of the invention may be implemented.

FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output ports ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 610. An encoder core or decoder core, or both, as described above, may be instantiated in FPGA architecture 600 with or without use of one or more DSPs 606.

In some FPGAs, each programmable tile includes a programmable interconnect element ("INT") 611 having standardized connections to and from a corresponding interconnect element 611 in each adjacent tile. Therefore, the programmable interconnect elements 611 taken together implement the programmable interconnect structure for the illustrated FPGA. Each programmable interconnect element 611 also includes the connections to and from any other programmable logic element(s) within the same tile, as shown by the examples included at the right side of FIG. 6.

For example, a CLB 602 can include a configurable logic element ("CLE") 612 that can be programmed to implement user logic plus a single programmable interconnect element 611. A BRAM 603 can include a BRAM logic element ("BRL") 613 in addition to one or more programmable interconnect elements 611. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element ("DSPL") 614 in addition to an appropriate number of programmable interconnect elements 611. An IOB 604 can include, for example, two instances of an input/output logic element ("IOL") 615 in addition to one instance of the programmable interconnect element 611. As will be clear to those of skill in the art, the actual I/O pads connected, for example, to the I/O logic element 615 are manufactured using metal layered above the various illustrated logic blocks, and typically are not confined to the area of the I/O logic element 615.

In the pictured embodiment, a columnar area near the center of the die (shown shaded in FIG. 6) is used for configuration, I/O, clock, and other control logic. Vertical areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 6 are purely exemplary. For example, in an actual FPGA more than one adjacent column of CLBs is typically included wherever the CLBs appear, to facilitate the efficient implementation of user logic. FPGA 600 illustratively represents a columnar architecture, though FPGAs of other architectures, such as ring architectures for example, may be used. FPGA 600 may be a Virtex-4™ FPGA from Xilinx of San Jose, Calif.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for scheduling channel access, comprising:
    obtaining information associated with incoming traffic to a scheduler of a node associated with user equipment and outgoing traffic from the scheduler to the user equipment, the user equipment capable of establishing a communication link with the node;
    placing the information obtained in respective queues, the respective queues each associated with the user equipment;
    obtaining a count level of the queues;
    determining an interval rate for the incoming traffic;
    obtaining a receive rate for the user equipment;
    determining an incoming average rate for the incoming traffic;
    determining an outgoing average rate for the outgoing traffic;
    generating a proportion value responsive to the incoming average rate, the outgoing average rate, the receive rate, and the interval rate, wherein the generating includes:

combining the incoming average rate and the outgoing average rate to provide a denominator value;

combining the interval rate and the receive rate to provide a numerator value;

dividing the numerator value by the denominator value to generate a proportion value; and allocating a bandwidth portion of a downlink side of the node to the user equipment responsive to the proportion value.

2. A method for scheduling channel access, comprising:

obtaining information associated with incoming traffic to a scheduler of a node associated with equipment of users and outgoing traffic from the scheduler to the equipment of users, the equipment of users being capable of establishing respective communication links with the node;

placing the information obtained in respective sets of queues, the sets of queues respectively associated with the equipment of users for a correspondence between the sets of queues and the communication links;

obtaining count levels of queues in the sets of queues;

determining interval rates for the incoming traffic as stored in a first portion of the sets of queues;

obtaining receive rates for the equipment of users;

determining incoming average rates for the incoming traffic responsive to the interval rates;

determining outgoing average rates for the outgoing traffic as stored in a second portion of the sets of queues;

respectively generating proportion values responsive to the incoming average rates, the outgoing average rates, the receive rates, and the interval rates, wherein the generating includes:

combining each incoming average rate and outgoing average rate respectively of the incoming average rates and the outgoing average rates to provide respective denominator values;

combining each incoming interval rate and receive rate respectively of the incoming interval rates and the receive rates to provide respective numerator values;

dividing each numerator value of the numerator values by each denominator value of the denominator values respectively associated therewith to generate respective proportion values; and allocating bandwidth portions of a downlink side of the node to at least a portion of the equipment of users responsive to at least a portion of the proportion values.

3. The method according to claim 2, wherein the equipment of users is identified as being currently potentially active with respect to the node.

4. The method according to claim 3, wherein the node is of an air transport mesh network.

5. The method according to claim 4, wherein the communication links are associated with at least one protocol.

6. The method according to claim 5, wherein the at least one protocol is for packet, ceil, or frame data traffic.

7. The method according to claim 5, wherein the at least one protocol is for a downlinking.

8. The method according to claim 7 wherein the at least one protocol is one of High Speed Downlink Packet Access, Wideband Code Division Multiple Access, Worldwide Interoperability for Microwave Access, or Code Division Multiple Access 2000.

9. The method according to claim 8, wherein the equipment of users includes at least one device selected from portable smart phones, personal data assistants, or notebook computers.

10. The method according to claim 2, wherein the interval rates are peak rates.

11. The method according to claim 10, wherein the incoming average rates and the outgoing average rates are respective running averages.

12. The method according to claim 10, wherein the sets of queues are respectively accessed round robin in association with the equipment of users for the determining of the interval rates and the determining of the outgoing average rates.

* * * * *